United States Patent
Lang et al.

[11] Patent Number: 5,220,751
[45] Date of Patent: Jun. 22, 1993

[54] PROCESSING INSTALLATION, ESPECIALLY FOR DENTAL PURPOSES, WITH TWO COMBINED DIFFERENT PROCESSING APPARATUSES

[75] Inventors: Hans-Walter Lang; Josef Wenger, both of Leutkirch, Fed. Rep. of Germany

[73] Assignee: Kaltenbach & Voigt GmbH & Co., Biberach an der Riss, Fed. Rep. of Germany

[21] Appl. No.: 727,476

[22] Filed: Jul. 9, 1991

[30] Foreign Application Priority Data

Jul. 10, 1990 [DE] Fed. Rep. of Germany ....... 4021953

[51] Int. Cl.⁵ .............................................. B24B 49/00
[52] U.S. Cl. ................................ 51/165 R; 51/165.74; 51/5 R; 51/5 C; 51/273
[58] Field of Search ................ 51/165 R, 165.74, 3 R, 51/5 R, 5 A, 5 B, 5 C, 273; 409/137, 158, 144; 29/27 A, 564, 28

[56] References Cited

U.S. PATENT DOCUMENTS

| 1,480,601 | 1/1924 | Dobyne | 51/273 |
| 2,231,134 | 2/1941 | Marchetta et al. | 51/273 |
| 2,470,601 | 5/1949 | Burke | 51/273 |
| 3,977,127 | 8/1976 | Mahnken . | |
| 4,221,081 | 9/1980 | Everett . | |
| 4,227,902 | 10/1980 | Olson | 51/273 |
| 5,018,319 | 5/1991 | Allard | 51/273 |

FOREIGN PATENT DOCUMENTS

| 705678 | 7/1941 | Fed. Rep. of Germany . |
| 6610274 | 6/1973 | Fed. Rep. of Germany . |
| 8905017.7 | 2/1989 | Fed. Rep. of Germany . |

Primary Examiner—M. Rachuba
Attorney, Agent, or Firm—Scully, Scott, Murphy & Presser

[57] ABSTRACT

A processing or machining installation, especially for dental purposes, with two combined different processing apparatuses. The installation possesses a common control and suctioning arrangement, and also incorporates a control circuit for the currently activated processing or treating apparatus, through the intermediary of which there is always compulsorily actuated the suctioning device in conjunction therewith.

10 Claims, 2 Drawing Sheets

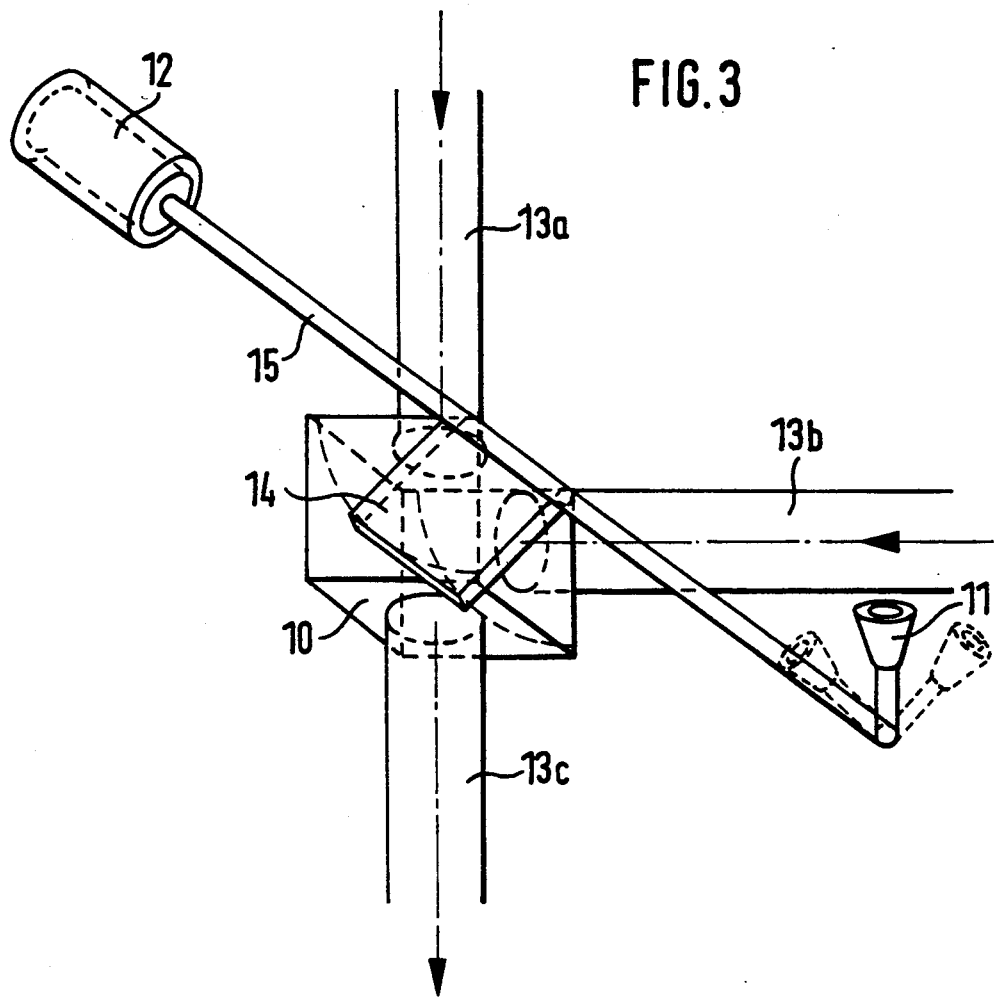
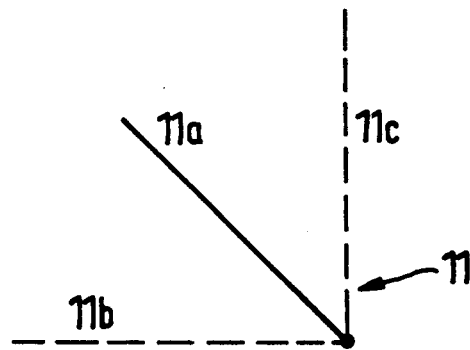

PROCESSING INSTALLATION, ESPECIALLY FOR DENTAL PURPOSES, WITH TWO COMBINED DIFFERENT PROCESSING APPARATUSES

BACKGROUND OF THE INVENTION

1. Field of the Invention

The present invention relates to a processing or machining installation, especially for dental purposes, with two combined different processing apparatuses.

During operation or working with apparatuses of that type, in particular grinding apparatuses, dust is produced which is not only damaging to the health of the person working with the apparatus, but also presents a contamination of the environment.

Consequently, the invention as described in detail hereinbelow, has as an object to provide a processing or treating installation of that kind which not only possesses a common control and suctioning arrangement, but also incorporates a control circuit for the currently activated processing or treating apparatus, through the intermediary of which there is always compulsorily actuated the suctioning device in conjunction therewith.

The advantages of this invention are predicated on a space-saving compact construction in a compulsory suctioning device, and in essence, in an energy-saving manner with only a single suctioning device for the activated processing apparatus.

2. Discussion of the Prior Art

From the disclosure of German Petty Patent 66 10 274 there has become known the utilization of a multipurpose worktool which consists of two different worktools which can be selectively operated from a common motor.

The disclosure of U.S. Pat. No. 3,977,127 sets forth a multi-purpose worktool, wherein a plurality of worktool shafts are driven through the intermediary of a belt drive from a common motor.

As set forth in the disclosure of U.S. Pat. No. 4,221,081, a belt grinding machine is equipped with a suctioning device.

BRIEF DESCRIPTION OF THE DRAWINGS

Reference may now be had to the following detailed description of an exemplary embodiment of an apparatus pursuant to the invention, taken in conjunction with the accompanying drawings; in which:

FIG. 2 illustrates a schematic representation of the common switch lever for the apparatus and the positions thereof; and FIG. 3 illustrates a perspective view of the switching device.

DETAILED DESCRIPTION

Figure 1:
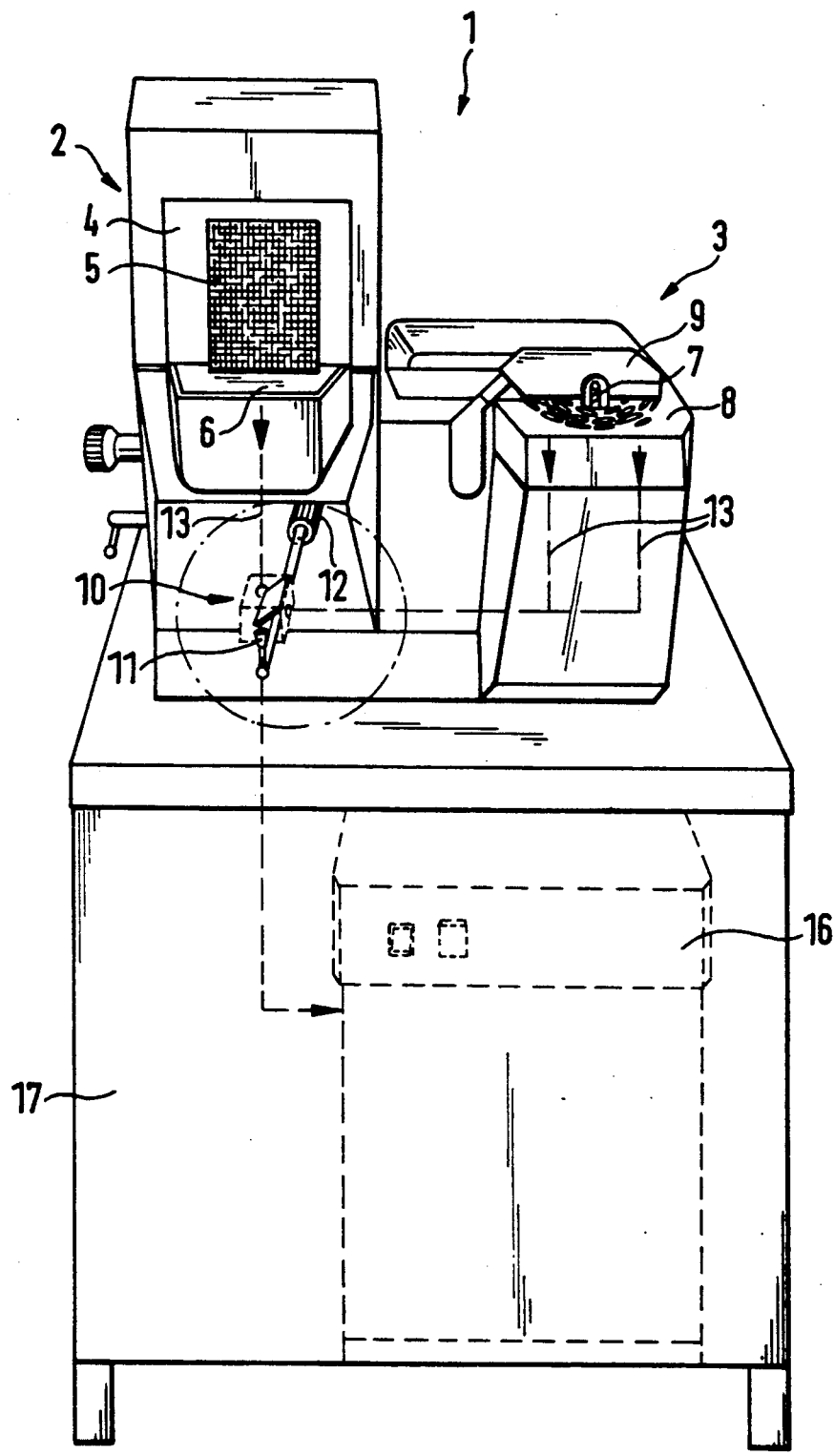
FIG. 1 illustrates a perspective front view of the inventive combined processing or treating apparatus.

In FIG. 1 of the drawings, reference numeral 1 generally designates the combined processing or treating apparatus; reference numeral 2 identifies the belt grinder apparatus with the grinding surface 4, the grinding belt 5 and the grinding table 6; whereas reference numeral 3 designates the milling apparatus with the milling worktool 7, the milling support surface 8 and a pivot lever 9 for the positioning of plaster cast or gypsum models which are to be treated or machined and for protection against any unintentional touching of the milling worktool 7.

Reference numeral 10 identifies the housing for the suctioning control with the switching lever 11; reference numeral 12 refers to the electrical switch, reference numeral 13 relates to the suctioning conduits, reference numeral 16 designates the suctioning device with a blower or the like; and reference numeral 17 identifies the base portion of the combined processing or treating apparatus 1 with the suctioning device.

In FIG. 2 of the drawing, reference numeral 11a represents the neutral zero-position for the switching lever 11, 11b defines its "grinding position" in which the grinding apparatus 2 is activated in conjunction with its suctioning device; reference numeral 11c identifies the "milling position" in which the milling apparatus 3 is activated in conjunction with its suctioning device.

In FIG. 3, the reference numeral 10 again identifies the housing for the circuit, reference numeral 11 designates the switching lever, reference numeral 12 identifies the electrical switch; 13a identifies the suctioning conduit leading from the grinding apparatus 2; reference numeral 13b is the conduit leading from the milling apparatus 3; both of which conduits terminate in the housing 10, and reference numeral 13c relates to the common exhaust-air conduit which leads to the suctioning arrangement 16 in the housing base portion 17. Arranged in the housing 10 is a three-way valve 14 which, in accordance with the switching, connects either the suctioning conduit 13a or the suctioning conduit 13b with the common exhaust-air conduit 13c.

What is claimed is:

1. A processing installation for dental workpieces, including two operatively combined working apparatus, one said working apparatus being a grinding apparatus having an upright grinding surface and the other said working apparatus being a milling apparatus having a milling worktool with a vertically directed axis of rotation; a grinding support surface for the workpieces on said grinding apparatus; a milling support surface for the workpieces on said milling apparatus; a suctioning device having a single suctioning source commonly connected with said two working apparatuses including a suctioning conduit connected to said suctioning source, said suctioning conduit having a Y-connection extending into first and second branch conduits, said first branch conduit leading to the grinding support surface and said second branch conduit leading to the milling support surface for the workpieces; valve means in said Y-connection for selectively connecting said first and second branch conduits with said suctioning source; switching means operatively connected with said valve means; and electrical control circuit means commonly connected with said working apparatuses and said switching means whereby activation of a selective one of said working apparatus by said switching means through said electrical control means concurrently actuates said valve means to connect the branch conduit communicating with said activated working apparatus with said sunctioning source.

2. A processing installation as claimed in claim 1, wherein said switching means comprises a switching lever selectively positionable in a first neutral position for deactivating both said working apparatuses and said suctioning source, a second position for actuating said grinding apparatus and said suctioning source, and a third position for actuating said milling apparatus and suctioning source.

3. A processing installation as claimed in claim 2, wherein said switching lever includes a shaft commonly mounting said electrical control circuit and valve means.

4. A processing installation as claimed in claim 3, wherein said electrical control circuit comprises an electrical switch, and said valve means comprises a three-way valve.

5. A processing installation as claimed in claim 4, wherein said three-way valve is arranged in a housing having connections for three suctioning conduits, a first one of said suctioning conduits leading from the grinding apparatus, a second one of said suctioning conduits leading from the milling apparatus; and a third one of said suctioning conduits being a common exhaust air conduit.

6. A processing installation as claimed in claim 5, wherein said suctioning source includes a suctioning blower located in a base portion of said housing.

7. A processing installation as claimed in claim 1, wherein said grinding apparatus comprises a belt grinding apparatus.

8. A processing installation as claimed in claim 7, wherein said belt grinding apparatus includes a vertically traveling grinding belt; and a horizontal grinding table surface being operatively associated with said grinding belt.

9. A processing installation as claimed in claim 1, wherein said milling apparatus includes a horizontal milling support surface; and a milling tool of said apparatus being pivotable about a vertical axis of rotation and projecting upwardly from said milling support surface.

10. A processing installation as claimed in claim 9, wherein said milling apparatus includes a pivot lever for effectuating the feed of workpieces which are to be processed by said apparatus.

* * * * *